March 24, 1970  R. E. GERACE  3,503,065
APPARATUS FOR AUTOMATICALLY AND REMOTELY
MONITORING A CONTROLLED ELEMENT
Filed Feb. 24, 1966  2 Sheets-Sheet 1

ROBERT E. GERACE
INVENTOR.

BY Charles C. Krawczyk

ATTORNEY

ROBERT E. GERACE
INVENTOR.

BY Charles C. Krawczyk

ATTORNEY

United States Patent Office 3,503,065
Patented Mar. 24, 1970

3,503,065
APPARATUS FOR AUTOMATICALLY AND REMOTELY MONITORING A CONTROLLED ELEMENT
Robert E. Gerace, Greece, N.Y., assignor to Bausch & Lomb Incorporated, Rochester, N.Y., a corporation of New York
Filed Feb. 24, 1966, Ser. No. 529,748
Int. Cl. H03k 13/00
U.S. Cl. 340—347      2 Claims

ABSTRACT OF THE DISCLOSURE

Apparatus selectively generates electrical signals in response to and representative of the movement of a controlled element. The apparatus has the further ability to distinguish irregular or erroneous movements of the controlled element from its regular or expected movements and will not generate any signals in response to the detected irregular or erroneous movements.

---

This invention relates to apparatus for generating electrical signals representing movement of a movable member and more particularly for deriving a series of electrical pulses corresponding to the movement of a movable member and converting the series of pulses into digital form corresponding to a measurement of the movement of the movable member.

In most automated controlled systems or processes, a controlled element is generally motor driven in response to changeable control conditions in a predetermined manner to achieve the desired system or process results. The movement of the controlled element generally provides a means for monitoring the changes in the control conditions. For example, in testing or analyzing equipment, the controlled element is a portion of a feedback servo system and is controlled to provide a desired test response or a balanced condition. The movement of the controlled element in reaching the balanced condition generally provides a means for measuring a signal or sample being analyzed or any changes therein.

If the movement or positioning of the controlled element is to be accurately monitored, an encoded device is generally coupled to move with the controlled element. The encoded device generally includes a plurality of perforations or magnetic portions therein. Sensing devices are mounted adjacent the encoded device to respond to the perforations or magnetic portions to provide a digital electrical signal corresponding to the movement of the controlled element. The movement of the controlled element is directly related to the number of perforations, or magnetic portions passing the sensing device so that the digital signals can be counted to provide a measurement that is a function of the amount or rate of the controlled element movement.

The accuracy by which the feedback servo system controls the movement of a controlled element is dependent upon its sensitivity. In order to overcome errors due to non-linearities such as friction, dead-band, etc., the gain of the servo system should be high. In addition, a highly responsive servo system is desirable so that the system will respond quickly to the applied drive signal to move the controlled element at the desired rate with a minimum error signal. Unfortunately such highly responsive high gain servo systems are sensitive to noise and transient conditions which result in a motor shaft jitter. The shaft jitter is reflected to the encoded device wherein the perforations or magnetic portions are undesirably oscillated with respect to the sensing device resulting in error signals. Such error signals are particularly noticeable when the system is nulled or when the controlled element is driven at slow rates.

It is therefore an object of this invention to provide new and improved apparatus for measuring the movement of a movable member.

It is also an object of this invention to provide new and improved apparatus for measuring the movement of a motor driven member which apparatus is insensitive to undesirable jitter in the driven member movement.

It is still a further object of this invention to provide new and improved apparatus for measuring the movement a driven controlled element and providing information corresponding to the movement of the controlled element in digital form.

Apparatus embodying the invention includes an information storage means having information stored therein in a preset pattern. The information storage means may, for example, be in a form of perforations or magnetic bits arranged in a preset pattern for detection by photoelectric or magnetic means to provide signal pulses corresponding to the movement of the information storage means. The information storage means is coupled to move in synchronous relation with a motor driven controlled element. The detection circuits include a pair of sensing devices mounted adjacent the information storage means adapted to detect the stored information in response to the movement of the information storage means and generate signals corresponding to the movement. The sensing devices are coupled to a circuit means that alternately accepts signals from the pair of sensing devices. The circuit means provides an output signal for each signal accepted from the sensing devices corresponding to the movement of the controlled element. By alternately accepting signals from the sensing devices the circuit means excludes any signals generated by the sensing devices due to erratic or erroneous movement of the information storage means in response to transient or noise signals applied to the motor driving controlled elements.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
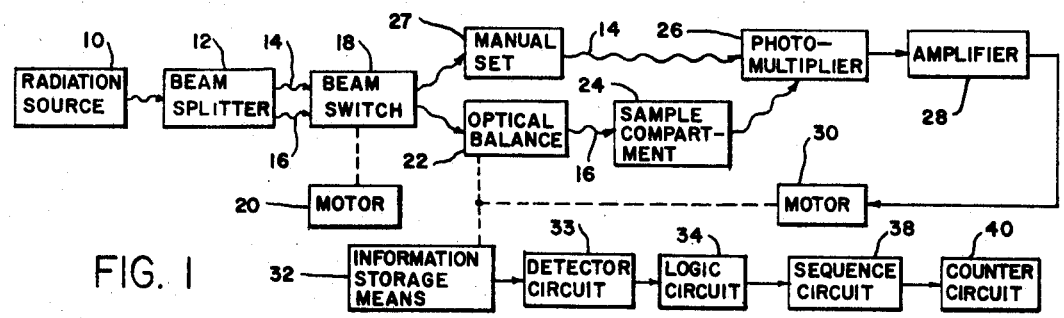
FIGURE 1 is a block diagram enzyme analyzing apparatus embodying the invention.

The measuring apparatus of the invention will be described in the context of an enzyme analyzer. It is to be understood, however, that the fundamental concepts to be described are more generally applicable. The enzyme analyzing apparatus of FIGURE 1 includes a source of radiation 10 applying radiation on a beam splitter 12. The beam splitter provides a sample and reference beam of radiation 14 and 16 to a beam switch 18. The beam switch 18 is driven by a motor 20 to alternately chop the radiation beams at a 60 cycle rate to produce alternate reference and sample beams 180° out of phase with each other and 90° out of phase with the line voltage. The chopped sample beam is passed through an optical balance apparatus 22 and a sample compartment 24 to a photomultiplier tube 26. The chopped reference beam is applied through manual set apparatus 27 that controls the intensity of the chopped reference beam applied to the photomultiplier 26. The electrical signals corresponding to the chopped reference and sample beams of radiation are generated by the photomultiplier 26, amplified by an amplifier 28 and applied to a field winding of a two phase servo motor 30. The other winding of the servo motor is energized by the line voltage. The servo motor 30 is coupled to drive the optical balance apparatus 22.

When a test sample is initially inserted in the sample compartment 24, alternate 60 cycle test sample and reference radiation beams are applied to the photomultiplier 26. The intensity of the test sample beam corresponds to the absorption or transmission characteristics of the test sample. The photomultiplier 26 generates a 60 cycle signal having an amplitude determined by the difference in intensity between the test sample and reference beams applied thereto. The amplified 60 cycle signal is supplied to the motor 30 which rapidly drives the optical balance apparatus 22 to an initial balance condition equalizing the intensity of the reference and test sample beams applied to the photomultiplier 26. When the intensities of the reference and sample beams are equalized the 60 cycle signal generated by the photomultiplier 26 is nulled and the system is balanced.

To measure enzyme activity of a test sample, the chemicals required to set up the required chemical reaction are included in the sample compartment along with the test sample. The transmission or absorption characteristics of the test sample change as the chemical reaction takes place providing a means for measuring the enzyme activity. The balancing apparatus 22 is first rapidly driven to initially balance the radiation beams to compensate for the initial optical density of the test sample. Once the initial balance has been reached, the optically balanced apparatus 22 is driven at a rate determined by the enzyme activity of the test sample. A measurement of the rate of enzyme activity is made by monitoring the movement of the optical balance apparatus 22.

Information storage means 32 such as a counter or encoded disk is coupled to move in synchronous relation with the optical balance apparatus 22. A detector circuit 33 detects the information stored in the information storage means 32 in response to the movement of the information storage means 32 to generate electrical signals that are a function of the movement of the optical balance apparatus 22. The electrical signals are applied to a logic circuit 34 providing a means for accepting selected ones of the electrical signals proportional to the movement of the optical balance apparatus and rejecting those signals that are generated as a result of erratic movement due to undesirable noise and transients introduced into the drive signal of the servo motor 30. As a result, the logic circuit 34 effectively only passes those signals corresponding to the overall movement of the optical balance apparatus.

The logic circuit is coupled to a sequence circuit 38 that is activated after a predetermined time interval of sufficient duration for the optical balance apparatus 22 to reach the initial balance or null position. After the predetermined time interval, the sequence circuit 38 applies the signals being passed by the logic circuit 38 for a preset measuring time duration to a counter circuit 40. The counter circuit counts the signals that are proportional to the movement of the optical balance apparatus 22 to provide a reading corresponding to the rate of enzyme activity for the measuring time duration.

Figure 2:
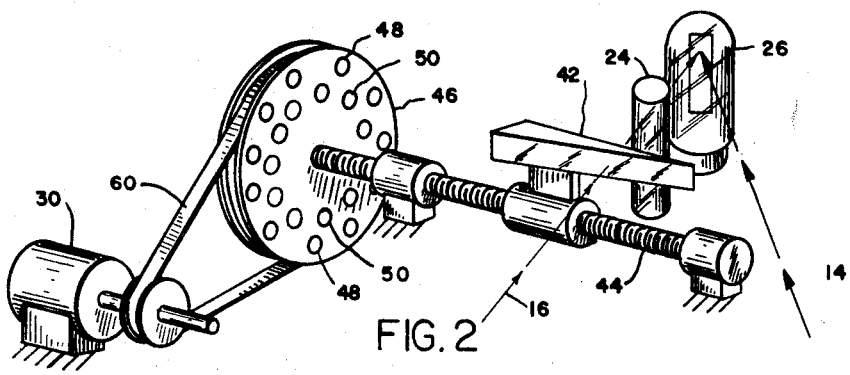
FIGURE 2 is a perspective diagram of the optical balancing system of FIGURE 1 including a servo motor, a counter disk, and the balancing optical wedge.

An embodiment of the optical balance system is illustrated in FIGURE 2 wherein an optical wedge 42 is driven by means of a ball screw 44 to change the optical wedge 42 thickness at the point wherein the sample beam 16 traverses the wedge. This provides a means of changing the optical path length of the sample beam between the source 10 and the photomultiplier tube 26 which according to the Beer Lambert equation is directly proportional to absorbance of the test sample in the sample compartment 24.

Figure 3:
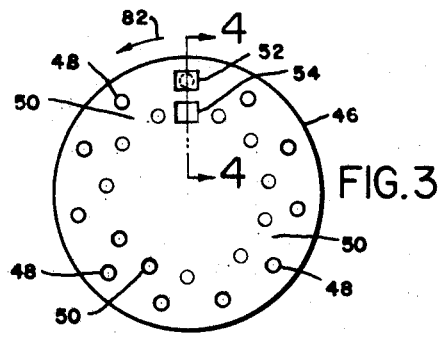
FIGURE 3 is a plan view of the counter disk of FIGURE 2.
Figure 4:
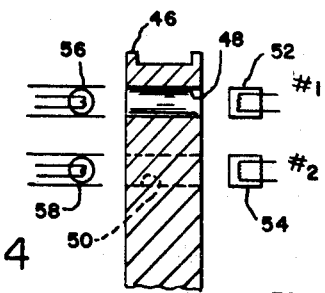
FIGURE 4 is a sectional view of the counter disk of FIGURE 3 taken along the line 4—4.

In the embodiment of FIGURE 2, the information storage means 32 comprises a large counter wheel or disk 46 coupled to rotate with the ball screw 44. The disk 46 includes two groups of 11 holes 48 and 50 (FIGURE 3) on separate concentric circles about the center of the disk 46. A pair of radiation sensitive devices 52 and 54, are mounted adjacent the disk 46 (FIGURES 4 and 3) so that the holes 48 in the outer concentric circle are adapted to pass radiation to the radiation sensitive device 52 and the holes 50 in the inner concentric circle are adapted to pass radiation to the radiation sensitive device 54. The source of radiation for the photosensitive devices includes the lamps 56 and 58 mounted on the opposite side of the disk 46 and aligned with the concentric circles including the holes 48 and 50 respectively (FIGURE 4), to provide the radiant energy required to actuate the radiation sensitive devices 52 and 54. The servo motor 30 is coupled through a belt 60 to drive the disk 46 and the optical wedge 42 in synchronous relation so that the number of holes passing the photosensors 52 and 54 correspond to the linear movement of the optical wedge 42 thereby providing signals corresponding to the linear movement of the optical wedge 42 and also the change in absorption or transmission characteristics of the test sample.

In order to provide maximum system accuracy, the gain of the feedback system including the amplifier 28, the photomultiplier tube 26 and the motor 30, is made as high as possible to minimize errors due to such non-linearities as friction, dead-band, etc. In addition, the servo system is designed to be as highly responsive as possible to provide for a rapid initial null and for the controlled movement of the optical wedge 42 at a rate corresponding to the change in the transparency of the test sample with a minimum of error.

With a highly responsive servo system, the apparatus is sensitive to noises and transients introduced into the system which in turn result in erratic motor shaft movement or jitter. Any jitter in the motor shaft will cause a corresponding movement in the disk 46. With a single radiation sensitive device detection system, the slightest jitter of the disk 46 often causes undesirable pulses of radiation to be applied to the radiation sensitive device particularly at the time when a hole is approaching or passing radiation sensitive devices resulting in erroneous signals. When a hole is approaching or just passing a radiation sensitive device, a jitter in the disk 46 may cause a series of radiation pulses to fall on the radiation sensitive device to generate a plurality of signals corresponding to a large movement of the disk when in fact the disk may have only moved slightly or jittered. The invention embodies a dual detection system and a logic circuit coupled to the detection system to effectively reject the erratic unwanted signals caused by such jitter.

Figure 5:
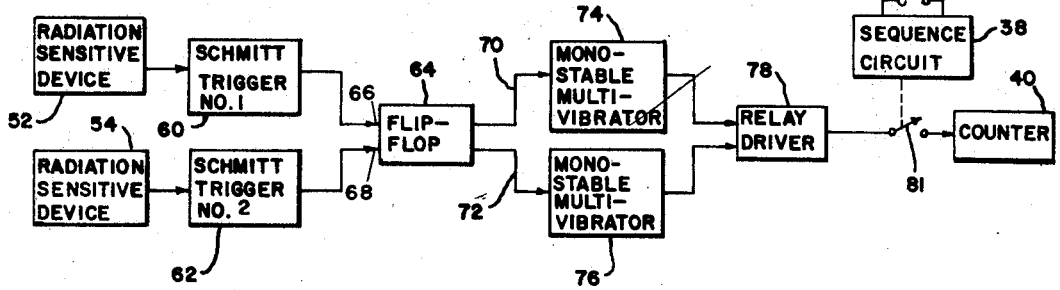
FIGURE 5 is a block diagram of the logic circuit of FIGURE 1.

Referring now to FIGURE 5 the radiation sensitive devices 52 and 54 are coupled to the Schmitt triggers 60 and 62 respectively. In response to an electrical pulse generated by the connected radiation sensitive device in response to movement of the disk, the Schmitt triggers 60 and 62 provide a constant amplitude pulse to switch a bi-stable flip-flop circuit 64 from one stable state to another. The Schmitt trigger 60 is coupled to the first input circuit 66 to switch the flip-flop into a first stable state while the Schmitt trigger 62 is coupled to a second input circuit 68 to switch the flip-flop 64 into a second stable state. The flip-flop 64 includes two output circuits 70 and 72 coupled to the monostable multivibrators 74 and 76 respectively. When the flip-flop is set in the first stable state, an output signal developed at the output circuit 70 is applied to the monostable multivibrator 74 so that the monostable multivibrator generates a signal of a preset amplitude and time duration. When the flip-flop 64 is set in its second stable state, a signal generated in the output circuit 72 causes the monostable multivibrator 76 to generate an output signal of a predetermined amplitude and time duration. The signals from the monostable multivibrator 74 and 76 are coupled to a relay driver 78 to actuate the relay driver each time the flip-flop 64 is switched from one stable state to another.

The sequencing circuit 38 is coupled between the relay driver 78 and the counter circuit 40. The sequencing circuit 38 can, for example, be a standard type motor-driven cam-operated switching circuit that is turned on for a predetermined time duration by a switch 79. The switch 79 is actuated each time a test sample is inserted in the sample compartment 24. The motor-driven cam will close a switch 81, coupled between the relay driver 78 and counter circuit 40, after a predetermined time duration sufficient for the optical wedge 42 to be driven to the initial balance. The switch 81 remains closed for the time duration required to monitor the rate of enzyme activity. Such motor-driven cam-operated switches are well known and therefore do not require any further explanation.

As the servo motor 30 rotates the disk 46 (thereby moving the optical wedge 42) the radiation sensitive devices 52 and 54 are alternately energized by radiation through the holes in the disk 46. The holes 48 and 50 are set in a preset pattern so that only one radiation sensitive device is energized at any particular time. When the disk 46 is rotated in a counterclockwise direction as illustrated by the arrow 82, the radiation sensitive device 54 is first actuated generating a signal that sets the flip-flop 64 in a first stable state causing the relay driver to generate one output pulse. As the disk 46 is rotated further, the radiation sensitive device 54 is inactivated while the radiation sensitive device 52 is activated generating a signal which switches the flip-flop 64 to the second stable state causing the relay driver 78 to generate a second pulse. Once the flip-flop 64 is switched into its first stable state no further signals generated by radiation sensitive device 54 are accepted by the logic circuit, until the flip-flop 64 is switched to its second stable state by a signal generated by the radiation sensitive device 52. Any signals generated by a radiation sensitive device due to jitter in the disk 46 will not be accepted by the logic circuit after the first pulse thereby rendering the counter 40 substantially insensitive to the undesirable motor shaft jitter.

Figure 6:
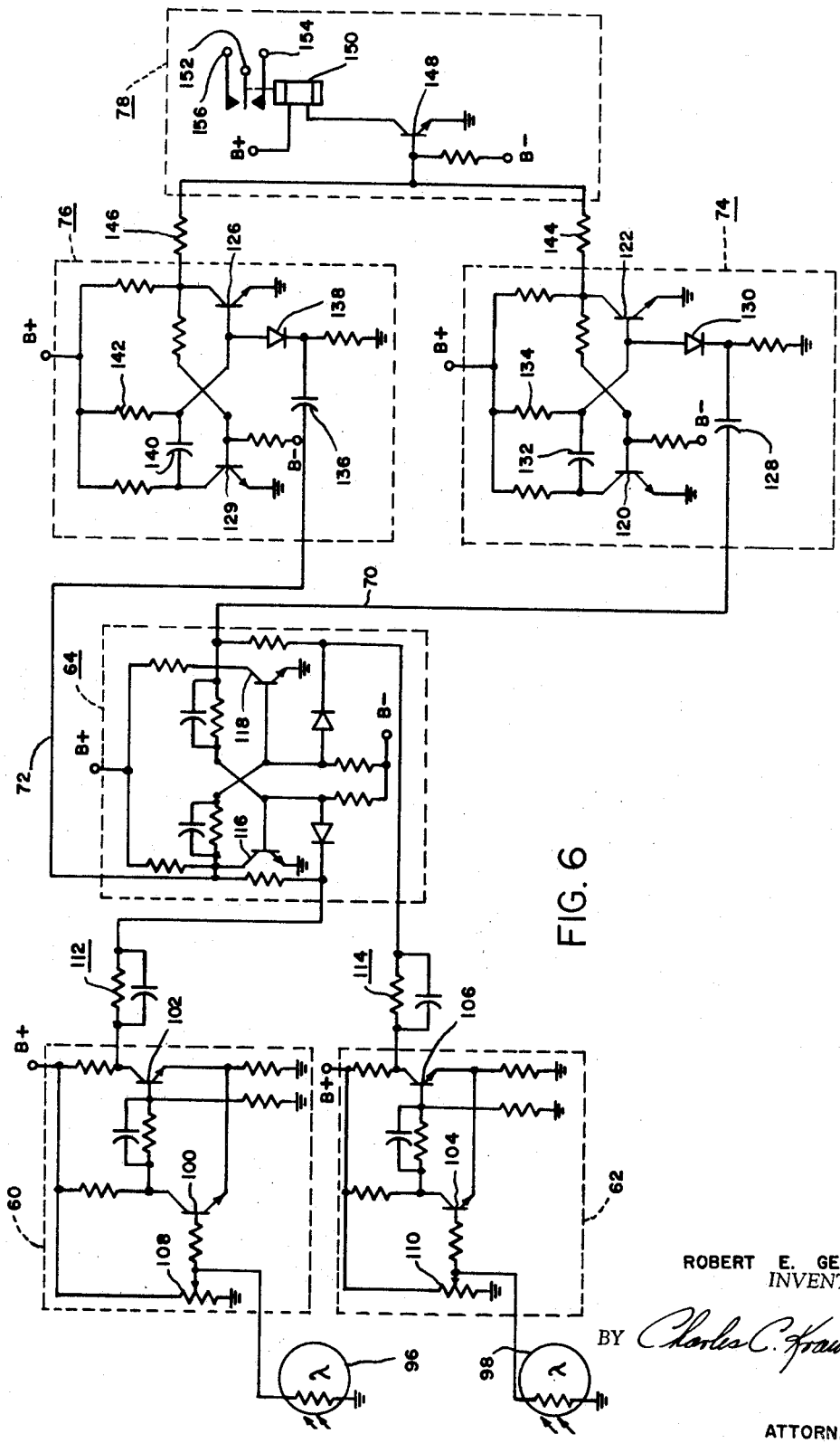
FIGURE 6 is a schematic diagram of the logic circuit of FIGURE 5.

The Schmitt trigger circuits 60 and 62 illustrated in the schematic diagram of FIGURE 6, each include a pair of transistors, 100 and 102, and 104 and 106 respectively. The Schmitt trigger circuits 60 and 62 are connected to the radiation sensitive devices 52 and 54 illustrated as the photoresistors 96 and 98. In response to applied radiation, the photoresistors 96 and 98 exhibit a large decrease in resistance reducing the bias voltage at the base electrodes of the transistors 100 and 104 respectively. In quiescent operating conditions, the transistors 100 and 104 are normally conducting while the transistors 102 and 106 are cut off. In response to applied radiation, the photoresistors 96 and 98 reduce the base voltage of the transistors 100 and 104 sufficiently to cause the transistors 100 and 104 respectively to be cut off and turn on the connected transistors 102 and 106 for the duration of the applied signal. A negative pulse, having a fixed amplitude, is generated at the collector electrode of the transistors 102 and 106. The potentiometers 108 and 110 in the Schmitt trigger circuits 60 and 62 respectively set the threshold value of a signal that must be generated by the photoresistor to activate the Schmitt trigger. The collector electrodes of the transistor 102 and 106 are coupled through the R-C (resistance-capacitance) networks 112 and 114 respectively to the bi-stable flip-flop stage 64.

The bi-stable flip-flop stage 64 includes a pair of transistors 116 and 118 coupled to the Schmitt trigger circuits 60 and 62 respectively. The transistor 116 is rendered nonconductive in response to a negative pulse developed at the collector of the transistor 102 switching the bi-stable flip-flop into its first stable state. Once the bi-stable flip-flop 64 is switched to its first stable state, any further signals generated by the Schmitt trigger circuit 60 in response to radiation applied to the photoresistor 96 has no effect on the bi-stable flip-flop thereby preventing the passage of signals generated by the photoresistor 96 due to erratic movement or jitter. The transistor 118 is rendered nonconductive in response to a negative pulse developed at the collector electrode of the transistor 106 switching the bi-stable flip-flop 64 into its second stable state. While in the second stable state, the bi-stable flip-flop 64 rejects any further signals generated Schmitt trigger circuit 62 in response to radiation applied to the photoresistor 98.

The collector electrodes of the transistors 116 and 118 are coupled to drive the monostable multivibrators 76 and 74 respectively. The monostable multivibrators 74 and 76 each include a pair of transistors, 120 and 122, and 124 and 126 respectively. The transistors 122 and 126 are normally conducting in absence of a signal, while the transistors 120 and 124 are cut off. When the bi-stable flip-flop 64 is switched into its first stable state wherein transistor 116 is cut off and the transistor 118 is conducting, the collector electrode of the transistor 118 is switched from a high positive potential to a low potential, effectively to ground potential. A negative going pulse is coupled through a connected capacitor 128 and a diode 130 to the base electrode of the transistor 122 to cut the transistor off which, in turn, renders the transistor 120 conductive. The monostable multivibrator 74 remains in the unstable state for a time duration determined by the R-C time constant of the capacitor 132 and the resistor 134.

When the bi-stable flip-flop 64 is switched to its second stable state wherein the transistors 116 is rendered conductive and transistor 118 is cut off, the collector electrode of the transistors 116 is switched from a high positive potential to a low potential. A negative going pulse is coupled through a connected capacitor 136 and a diode 138 to the base electrode of the transistor 126 to cut the transistor off and in turn render the transistor 124 conductive. The monostable multivibrator 76 remains in the unstable state for a time duration determined by the R-C time constant of the capacitor 140 and the resistor 142.

Each time the monostable multivibrators 74 and 76 are switched from the stable state, transistors 122 and 126 conducting, to the unstable state, transistors 122 and 126 nonconducting, and back again after the preset R-C time duration, a positive pulse of fixed amplitude and time duration is generated at the collector electrodes of the transistors 122 and 126 respectively. The collector electrodes of the transistors 122 and 126 are coupled through the resistors 144 and 146 respectively to the base electrode of a relay driver transistor 148 coupled to actuate a relay 150. The transistor 148 is normally biased nonconductive, when the monostable multivibrators are in the stable state and the transistors 122 and 126 are conductive. When one of the monostable multivibrators 74 and 76 is switched to the unstable state, the positive pulse generated at the collector electrodes of the transistors 122 or 126 renders the transistor 148 conductive to actuate the relay 150 for the duration of the positive pulse. The movable relay contact 152 is moved for connection to a relay contact 154 and disconnects from the relay contact 156. The contacts 152, 154 and 156 are coupled to the counter circuit 40 to provide a switching signal each time the bi-stable flip-flop 64 accepts alternate signals from the photoresistors 52 and 54, or each time the flip-flop 64 switches from one stable state to another, thereby providing a signal that is proportional to the movement of the optical wedge 42 (FIGURE 2) that is substantially independent of erratic movement or jitter in the servo system due to noise or other spurious signal.

The counter circuit may, for example, be a commercially available Presin counter Model A2–6. The Presin counter responds to the actuation of the relay contacts 152–156 to count the number of times the relay contacts are closed over the predetermined counting period and print a reading corresponding to the rate of enzyme activity of the test sample.

What is claimed is:

1. Apparatus for automatically and remotely monitoring a controlled element comprising:
   (a) a motor coupled to drive said controlled element;
   (b) a disk having information stored therein in the form of a prearranged pattern of equally spaced perforations in first and second circles concentric with the center of said disk, said perforations being arranged so that a radius of said disk will intersect, at the most, only one perforation;
   (c) a source of radiation;
   (d) first and second radiation sensitive devices for generating electrical signals in response to the receipt of radiation from said source;
   (e) means for rotatably mounting said disk intermediate said source of radiation and said radiation sensitive devices so that said first radiation sensitive device receives radiation through said perforations in said first circle and said second radiation sensitive device receives radiation through said perforations in said second circle so that only one of said first and second radiation sensitive devices receives radiation at any one time;
   (f) coupling means connecting said disk to said controlled element for rotating said disk in synchronous relation to the movement of said controlled element;
   (g) a bi-stable flip-flop circuit including first and second input circuits and first and second output circuits;
   (h) first circuit means coupling said first radiation sensitive device to said first input circuit of said flip-flop circuit for applying signals to switch said bi-stable flip-flop circuit to its first stable state;
   (i) second circuit means coupling said second radiation sensitive device to said second input circuit of said flip-flop circuit for applying signals to switch said bi-stable flip-flop circuit to its second stable state;
   (j) a first and second monostable multivibrator stage;
   (k) third circuit means coupling said first and second monostable multivibrators to said first and second output circuits of said bi-stable flip-flop respectively, so that one of said monostable multivibrators develops an output pulse each time said bi-stable flip-flop is switched from one of its stable states to the other;
   (l) a counter circuit; and
   (m) fourth circuit means coupling said first and second monostable multivibrators to said counter circuit for counting each time said bi-stable flip-flop is switched from one stable state to another thereby providing a count corresponding to movement of said controlled element only when said movement is in response to reactions of said test sample to the exclusion of signals generated by said first and second radiation sensitive devices due to erratic movement of said controlled element.

2. Apparatus for automatically and remotely monitoring the reactions of a test sample during its analysis which comprises:
   (a) first detection means for sensing changes occurring in said test sample and for generating signals indicative of these changes;
   (b) driving means responsive to the signals generated by said first detection means;
   (c) a controlled element coupled to said driving means for movement thereby in response to the changes detected in the test sample;
   (d) information storage means having information stored therein in a prearranged pattern;
   (e) coupling means connecting said information storage means to said controlled element for synchronous movement therewith;
   (f) second detection means, including a pair of sensing devices, located adjacent said information storage means for detecting said information stored in said information storage means and for generating electrical signals in response thereto;
   (g) a bi-stable circuit having first and second input circuits, said bi-stable circuit being adapted to be switched into one of a first and second stable states by applying a signal from one of said sensing devices to one of said first and second input circuits and to remain in said stable state until a second signal is applied to the other of said first and second input circuits from the other of said sensing devices;
   (h) first circuit means for coupling said pair of sensing devices to said first and second input circuits of said bi-stable circuit so that said bi-stable circuit alternately accepts signals from said pair of sensing devices for alternately switching said bi-stable circuit between its first and second stable conditions; and
   (i) second circuit means coupled to said bi-stable circuit for developing a switching signal each time said bi-stable circuit is switched from one of its stable states to the other, thereby providing a signal corresponding to movement of said controlled element only when said movement is in response to reactions of said test sample.

References Cited

UNITED STATES PATENTS

| | | | |
|---|---|---|---|
| 2,755,020 | 7/1956 | Belcher | 340—347 |
| 2,860,326 | 11/1958 | Walton | 340—347 |
| 3,028,589 | 4/1962 | Broadwell | 340—347 |
| 2,944,157 | 7/1960 | McAuslan et al. | |
| 2,948,890 | 8/1960 | Barth et al. | 340—347 |
| 3,024,986 | 3/1962 | Stranese et al. | 340—359 |
| 3,304,434 | 2/1967 | Koster. | |
| 3,349,325 | 10/1967 | Bajars | 340—347 |
| 3,376,549 | 4/1968 | Ford | 340—347 |
| 3,381,288 | 4/1968 | Van Vlodrop | 340—347 |

DARYL W. COOK, Primary Examiner

JEREMIAH GLASSMAN, Assistant Examiner